(12) United States Patent
Fu et al.

(10) Patent No.: US 11,376,935 B2
(45) Date of Patent: Jul. 5, 2022

(54) FULLY-EMBEDDED VEHICLE COVER

(71) Applicant: Hangzhou Golden Sun Auto Parts Co., Ltd., Hangzhou (CN)

(72) Inventors: Jinqin Fu, Hangzhou (CN); Shaoyong Zheng, Hangzhou (CN); Feng Wang, Hangzhou (CN); Chenshan Lin, Hangzhou (CN); Peng Cao, Hangzhou (CN); Xue'e Wang, Hangzhou (CN); Xiaohong Tang, Hangzhou (CN)

(73) Assignee: HANGZHOU GOLDEN SUN AUTO PARTS CO., LTD., Hangzhou (CN)

( * ) Notice: Subject to any disclaimer, the term of this patent is extended or adjusted under 35 U.S.C. 154(b) by 153 days.

(21) Appl. No.: 16/891,349

(22) Filed: Jun. 3, 2020

(65) Prior Publication Data

US 2021/0379973 A1 Dec. 9, 2021

(51) Int. Cl.
*B60J 7/14* (2006.01)
*B60J 7/19* (2006.01)
*B60J 7/10* (2006.01)

(52) U.S. Cl.
CPC .............. *B60J 7/141* (2013.01); *B60J 7/198* (2013.01); *B60J 7/106* (2013.01)

(58) Field of Classification Search
CPC ... B60J 7/198; B60J 7/141; B60J 7/106; B60J 7/068; B60J 11/06; B60J 11/00; B60J 10/90
USPC ...... 296/100.03, 136.03, 37.16, 100.7, 100.4
See application file for complete search history.

(56) References Cited

U.S. PATENT DOCUMENTS

| | | | | |
|---|---|---|---|---|
| 9,815,358 | B1* | 11/2017 | Quintus | ................... B60J 7/141 |
| 2016/0340949 | A1* | 11/2016 | Xu | .......................... E05D 3/125 |
| 2018/0339581 | A1* | 11/2018 | Rossi | ....................... B60J 7/198 |
| 2019/0100088 | A1* | 4/2019 | Facchinello | ............ B60J 10/00 |

FOREIGN PATENT DOCUMENTS

CN 108189655 A * 6/2018

* cited by examiner

*Primary Examiner* — Joseph D. Pape
*Assistant Examiner* — Veronica Marie Shull
(74) *Attorney, Agent, or Firm* — Muncy, Geissler, Olds & Lowe, P.C.

(57) ABSTRACT

A fully-embedded vehicle cover is disclosed, the main cross rod being maintained in parallel to the auxiliary cross rod; T-shaped embedding slots being provided on both the main cross rod and the auxiliary cross rod; T-shaped embedding bars are provided on the elastic sealing bar; the embedding bars being clamped and embedded in the embedding slots; the elastic sealing bar being used for sealing gaps between the main cross rod and the auxiliary cross rod; the longitudinal rod and the main or auxiliary cross rod being directly or indirectly sealingly matched with together to form a plurality of frames; and the cover plate being sealingly clamped and embedded in the frames. There is no fitting gap between the longitudinal rod, the main cross rod, the auxiliary cross rod, the cover plate and the elastic sealing bar in the vehicle cover, which can ensure no water leakage or seepage.

17 Claims, 15 Drawing Sheets

FULLY-EMBEDDED VEHICLE COVER

BACKGROUND OF THE INVENTION

Field of the Invention

The invention relates to a field of automobile parts, in particular to a fully-embedded vehicle cover.

Description of the Related Art

A hopper of a pick-up truck (also called pick-up car) is used to pull goods, and due to a open shape of its hopper, people proposed a cover to prevent rain from wetting the goods in the bed in rainy and snowy weather, which cover is installed on the hopper of the pick-up truck to cover the goods therein, avoiding the wetting of the goods in the bed by the rain.

The current vehicle cover is structured as follows: a plurality of cover plates which can be turned over are mounted on a frame by using a hinge or other structure, with gaps still existing between the cover plates, and thus water drops still can penetrate into the from between the gaps.

BRIEF SUMMARY OF THE INVENTION

Aiming at the above problems, a fully-embedded vehicle cover is provided in this invention.

The technical scheme adopted by the invention is as follows:

It is provided a fully-embedded vehicle cover which comprises a cover plate, a main cross rod, an auxiliary cross rod, a longitudinal rod, an elastic sealing bar and a plug bar, the main cross rod being maintained in parallel to the auxiliary cross rod; T-shaped embedding slots being provided on both the main cross rod and the auxiliary cross rod; T-shaped embedding bars are provided on the elastic sealing bar; the embedding bars being clamped and embedded in the embedding slots; the elastic sealing bar being used for sealing gaps between the main cross rod and the auxiliary cross rod; the longitudinal rod and the main or auxiliary cross rod being directly or indirectly sealingly matched with together to form a plurality of frames; and the cover plate being sealingly clamped and embedded in the frames.

The main cross rod and the auxiliary cross rod are hinged together by using the elastic sealing bar, and due to the elasticity of the elastic sealing bar, the main cross rod and the auxiliary cross rod can rotate with respect to each other with a good sealing performance maintained, thus ensuring that there is no gap between the main cross rod and the auxiliary cross rod; meanwhile, with no gap resulting from a sealing matching between the cover plate and the main cross rod, the auxiliary cross rod and the longitudinal rod and with a sealing matching between the longitudinal rod and the main or auxiliary cross rod, there is no gap between the longitudinal rod, the main cross rod, the auxiliary cross rod, the cover plate and the elastic sealing bar, thus ensuring no water leakage or seepage. And the T-shaped embedding slots and the T-shaped embedding bars can guarantee that there is no disengagement from the matching between them when rotating.

There is no fitting gap between the longitudinal rod, the main cross rod, the auxiliary cross rod, the cover plate and the elastic sealing bar in the vehicle cover, which can ensure no water leakage or seepage.

Optionally, it further comprises a main joint and an auxiliary joint, the main joint being fixed with a main cross rod and a longitudinal rod respectively to form a frame, the auxiliary joint being fixedly connected with the auxiliary cross rod and the longitudinal rod to form a frame, and the longitudinal rod being perpendicular to the main cross rod or the auxiliary cross rod; and the main joint being provided with a rotating groove, the auxiliary joint being provided with a rotating head, and the rotating head being positioned in the rotating groove.

Specifically, the main joint and the auxiliary joint are fixedly connected with the main cross rod, the auxiliary cross rod or the longitudinal rod in a screw fixing manner, and the main joint and the auxiliary joint both can be made of materials such as rubber and the like, which presents some degree of hardness and good elasticity to ensure a sealing effect, and in which one end of the main cross rod can be embedded between the main joint and the auxiliary joint in order to reduce a fitting gap with maximum probability. The rotating head and the rotating groove function as a limit to ensure that there is no relative sliding offset between the main joint and the auxiliary joint. Optionally, the rubber plug comprises a main plug bar and an auxiliary plug bar, the main plug bar being arranged on the main cross rod and used for sealing the gap between the main cross rod and the elastic sealing bar; the auxiliary plug bar being arranged on the auxiliary cross rod and used for sealing the gap between the auxiliary cross rod and the elastic sealing bar.

Optionally, a rotating circular cavity is provided on the auxiliary cross rod, and a rotating cylinder is provided on the main cross rod, the rotating cylinder being matched with the rotating circular cavity and the auxiliary plug bar elastically pressing the rotating cylinder against into the rotating circular cavity.

The existence of the rotating circular cavity and the rotating cylinder equivalently makes the directly hinging of the main cross rod and the auxiliary cross rod together possible, which, in conjunction with the connecting effect of the elastic sealing bar, hinges the main cross rod and the auxiliary cross rod together, thus ensuring a stronger connection between the main cross rod and the auxiliary cross rod.

Optionally, the main plug bar is an H-shaped main plug bar, and the auxiliary plug bar is a half-frame-shaped auxiliary plug bar; three contact surfaces of the main plug bar respectively press against the rotating cylinder, the main cross rod and the elastic sealing bar, and three contact surfaces of the auxiliary plug bar press against the auxiliary cross rod, and one contact surface of the auxiliary plug bar presses against the elastic sealing bar.

Optionally, an inner recess is provided on the elastic sealing bar, projecting pieces which are plugged and matched with the inner recess are provide on the main cross rod and the auxiliary cross rod; and the main cross rod, the auxiliary cross and the longitudinal rod are all provided with a bayonet in which the cover plate is sealed and clamped.

A relative rotation between the main cross rod (and the auxiliary cross rod) and the elastic sealing bar can be made by the plugging matching of the projecting pieces and the inner recess, without any water leakage at the sealing matching. The sealing and clamping effect of the bayonet can ensure that no water leakage occurs between the cover plate and the main cross rod, the auxiliary cross rod and the longitudinal rod. And in order to ensure there is no water seepage, glue can be applied between the cover plate and the main cross rod, between the cover plate and the auxiliary cross rod, and between the cover plate and the longitudinal rod to prevent water.

Optionally, it further comprises an attached rod, a limiting block and a lock tongue base, the main cross rod or the auxiliary cross rod being arranged on the attached rod, the limiting block being installed on the attached rod, and the lock tongue base being directly or indirectly elastically installed on the main cross rod or the auxiliary cross rod; a lock tongue groove being provided on the lock tongue base and the lock tongue groove of the lock tongue base being used for clamping and matching with the limiting block; and the limiting block being clamped and matched with the lock tongue groove when the attached rod is clamped between the lock tongue base and the cover plate.

In the above-mentioned structure, with the clamping and matching of the lock tongue base and the limiting block, the lock tongue base and the limiting block are made to be clamped and matched together when the lock tongue base and the cover plate clamp the attached rod, so that the cover plate cannot move relative to the attached rod, and the cover plate will not move forward to be folded due to inertia even if the pick-up truck brakes sharply during driving.

Optionally, it further comprises a positioning block and a spring, the positioning block being directly or indirectly fixedly arranged on the main cross rod or the auxiliary cross rod and the lock tongue base being slidably mounted on the positioning block; one end of the spring being abutted against the positioning block while the other end of the spring is abutted against the lock tongue base.

Optionally, it further comprises a linkage rod and a connecting block, the connecting block being slidably mounted on the lock tongue base and two ends of the linkage rod being respectively fixedly matched with one connecting block.

Because both ends of a cover plate need to be respectively provided with a lock tongue base to be matched with the limiting block on the clamping rod, the connecting block and the linkage rod are arranged so that the two lock tongue bases in a line can move synchronously.

Optionally, it further comprises a clamp sliding block, a clamp fixing block, a clamping bolt and a puller bolt, a slide limiting track being provided on the clamp sliding block, the clamping bolt being matched with a screw hole on the clamp fixing block and the clamping bolt being slidably matched with the slide limiting track; the puller bolt being mounted on the screw hole of the clamp sliding block with one end thereof being pressed against the clamp fixing block, and the puller bolt being perpendicular to the clamping bolt; the attached rod being movably clamped between the clamp sliding block and the clamp fixing block.

The function of the clamp sliding block, clamp fixing block, clamping bolt and puller bolt is to facilitate the installation of the attached rod on the hopper of the pick-up truck.

Optionally, the clamp fixing block and the clamp sliding block are both provided with a corrugated groove which is used for increasing a friction force between the clamp fixing block and the clamp sliding block or the attached rod; and the clamp fixing block is an L-shaped one, and the clamp sliding block is also an L-shaped one.

Optionally, it further comprises a waterproof bar and a hollow bar, the waterproof bar being arranged on the attached rod and the hollow bar being arranged on a main cross rod or an auxiliary cross rod or a longitudinal rod; the waterproof bar being maintained in parallel to the hollow bar and the waterproof bar being maintained in parallel to the hollow bar; and the waterproof bar and the hollow bar being closely attached against the attached rod and the longitudinal rod. Specifically, the hollow bar is a hollow rubber bar, and the waterproof bar is a waterproof rubber bar. As the waterproof rubber bar and the hollow rubber bar are arranged between the longitudinal rod and the attached rod, for which a double sealing waterproof effect is achieved, water cannot penetrate between the attached rod and the frame.

Optionally, it also comprise a side bar, which are arranged on the main joint or the auxiliary joint or on the main cross rod or the sub cross rod or the longitudinal rod.

The side bar is a side rubber bar, and the function of arranging the side rubber bar is to guide the water from the cover plate, so that this water will not flow to the vicinity of the attached rod and the frame.

Optionally, it further comprises a drainage pipe and a drainage joint, a drainage groove being provided on the attached rod, the drainage joint being fixed on the attached rod, the drainage pipe being mounted on the drainage joint which is communicated with the drainage pipe and the drainage groove.

The purpose of setting the drainage groove is to collect the water that seeps into the attached rod, and then drain the water in the drainage groove by a water guiding function of the drainage pipe. Optionally, the drainage joint is plugged and matched with the attached rod through its own protruding block, and the drainage joint and the attached rod are fixed together through screws. The plugging and matching of the drainage joint with the attached rod through its own protruding block ensures that the drainage joint does not shift from and shake with the attached rod. Optionally, it further comprises a support rod and a support base, one end of the support rod being directly or indirectly hinged with the cover plate while the other end thereof is used for movably matching with the support base, and the support base being mounted on the attached rod. Because the cover plate needs to be folded on the attached rod when the hopper is not covered, the above structure is provided so that when the cover plate is folded on the attached rod, the support rod is clamped between the base and a supporting slider, and the support rod is used to support and fix the cover plate. And one end of the support rod is hinged on the cover plate or on the main cross rod or the auxiliary cross rod while the other end thereof is clamped between the base and the supporting slider, so the whole process of causing the cover plate to cover and fold (i.e. open) is very convenient.

Optionally, a mounting chute is provided on the attached rod, and the support base comprises a base, a supporting slider, a spring, a puller block and an adjusting bolt, the base being slidably mounted on the mounting chute of the attached rod, the adjusting bolt being mounted on the base, the adjusting bolt being used for clamping the base on the attached rod, the supporting slider being slidably mounted on the base, the puller block being fixed on the base, both ends of the spring being respectively pressed against the puller block and the supporting slider, and the gap between the supporting slider and the base being used for clamping the support rod.

Optionally, it further comprises a plug socket and a plug buckle, the plug socket being directly or indirectly fixed on the attached rod, the plug buckle being directly or indirectly fixed on the cover plate, and the plug buckle being used for movably plugging and matching with the plug socket. Because a part of the frame is fixed on the attached rod, the plug socket and the plug buckle described above are arranged so that the whole cover plate system can be disassembled from the attached rod at any time as required through the detachable matching of the plug socket and the plug buckle.

Optionally, it further comprises a connecting rod, a cushion block and a connecting piece, the connecting rod connecting two parallel and adjacent attached rods together; the plug socket being fixed on the connecting rod through the cushion block; the plug buckle being fixed on the connecting piece which is directly or indirectly fixed on the cover plate.

Because there are two attached rods which are parallel, the two attached rods need to be connected together by a connecting rod, and a plurality of plug sockets can be provided through an arrangement thereof on the connecting rod, and specifically the connecting piece is fixed on the main cross rod or the auxiliary cross rod of the frame.

The invention presents the beneficial effects that: there is no fitting gap between the longitudinal rod, the main cross rod, the auxiliary cross rod, the cover plate and the elastic sealing bar in the vehicle cover, which can ensure no water leakage or seepage.

Figure 1:
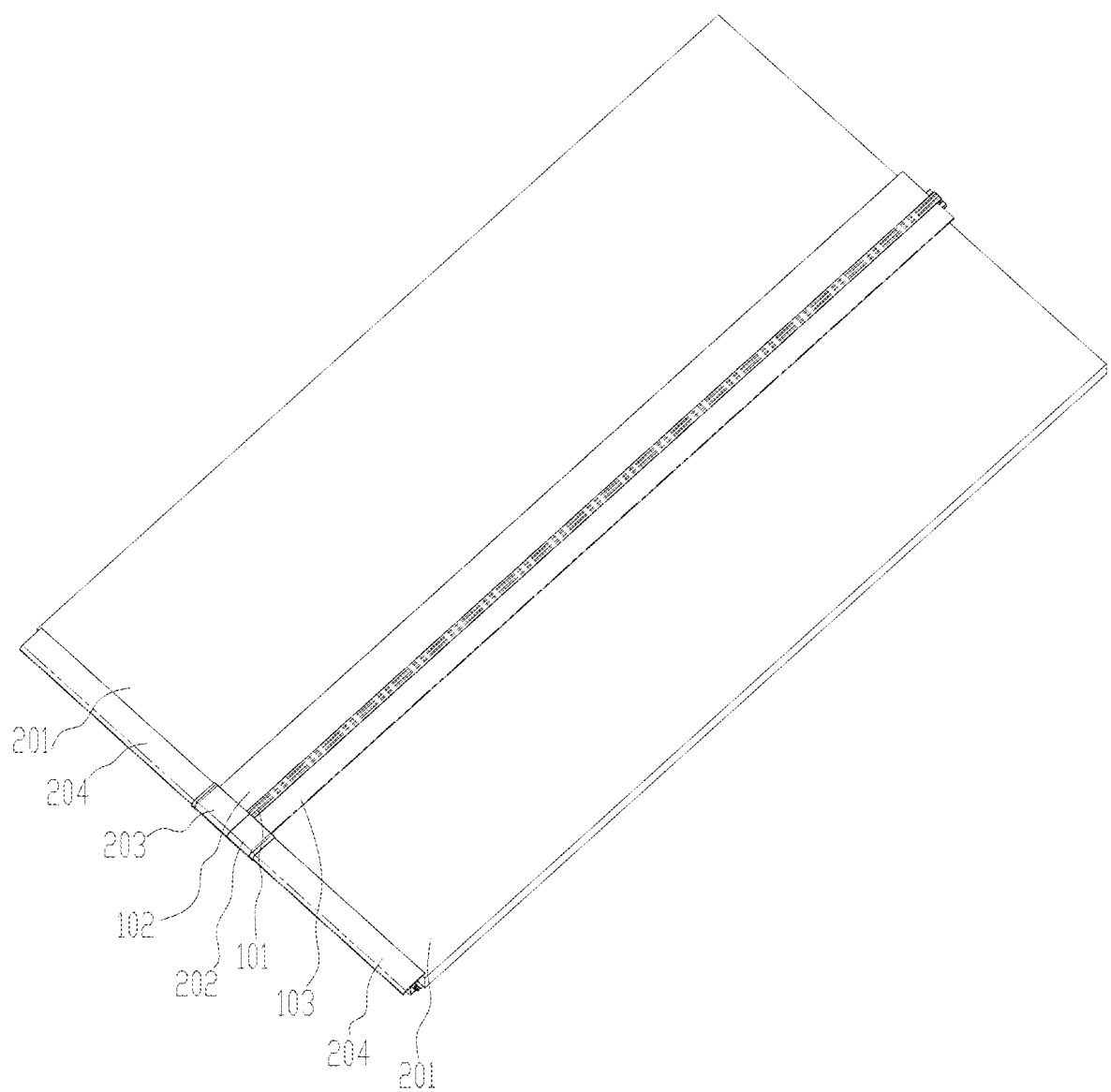
FIG. 1 is a schematic diagram of the structure of a fully-embedded vehicle cover.
Figure 2:
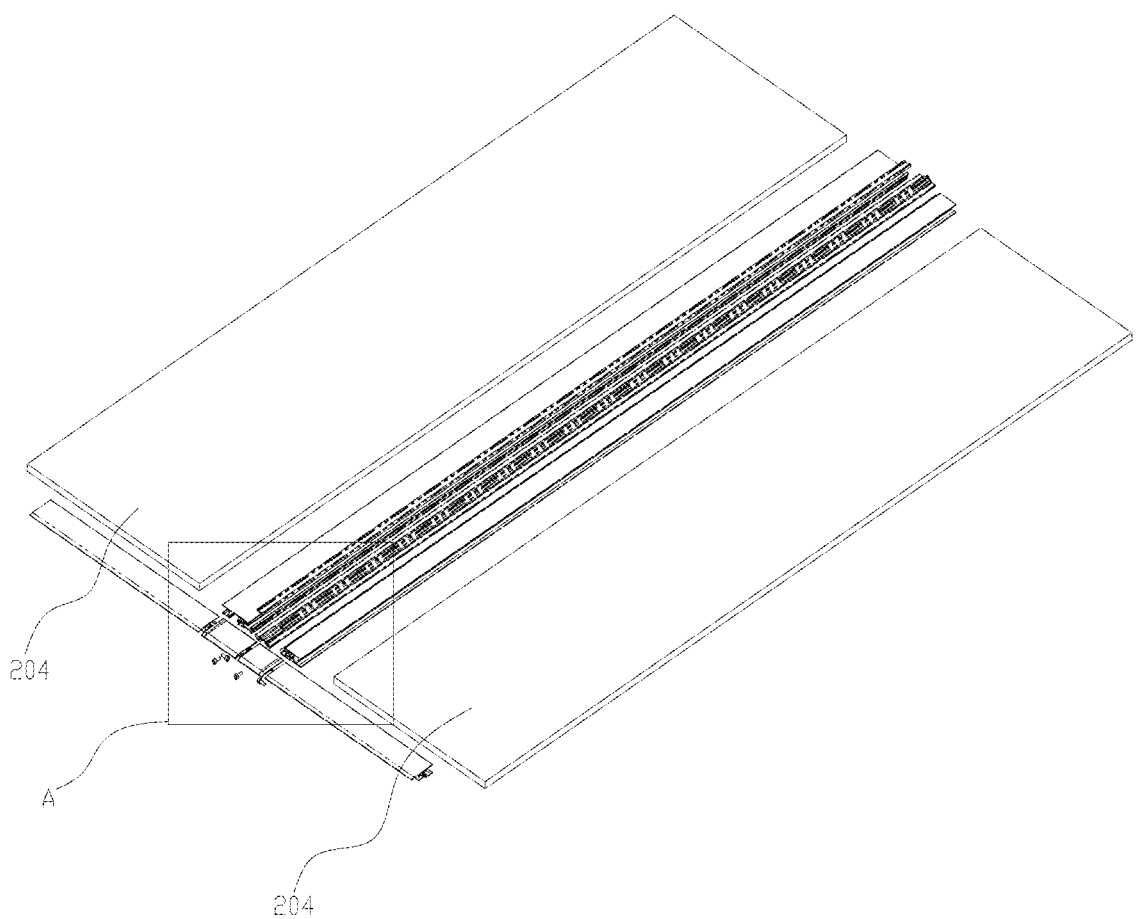
FIG. 2 is an exploded schematic diagram of a frame structure of a fully-embedded vehicle cover.
Figure 3:
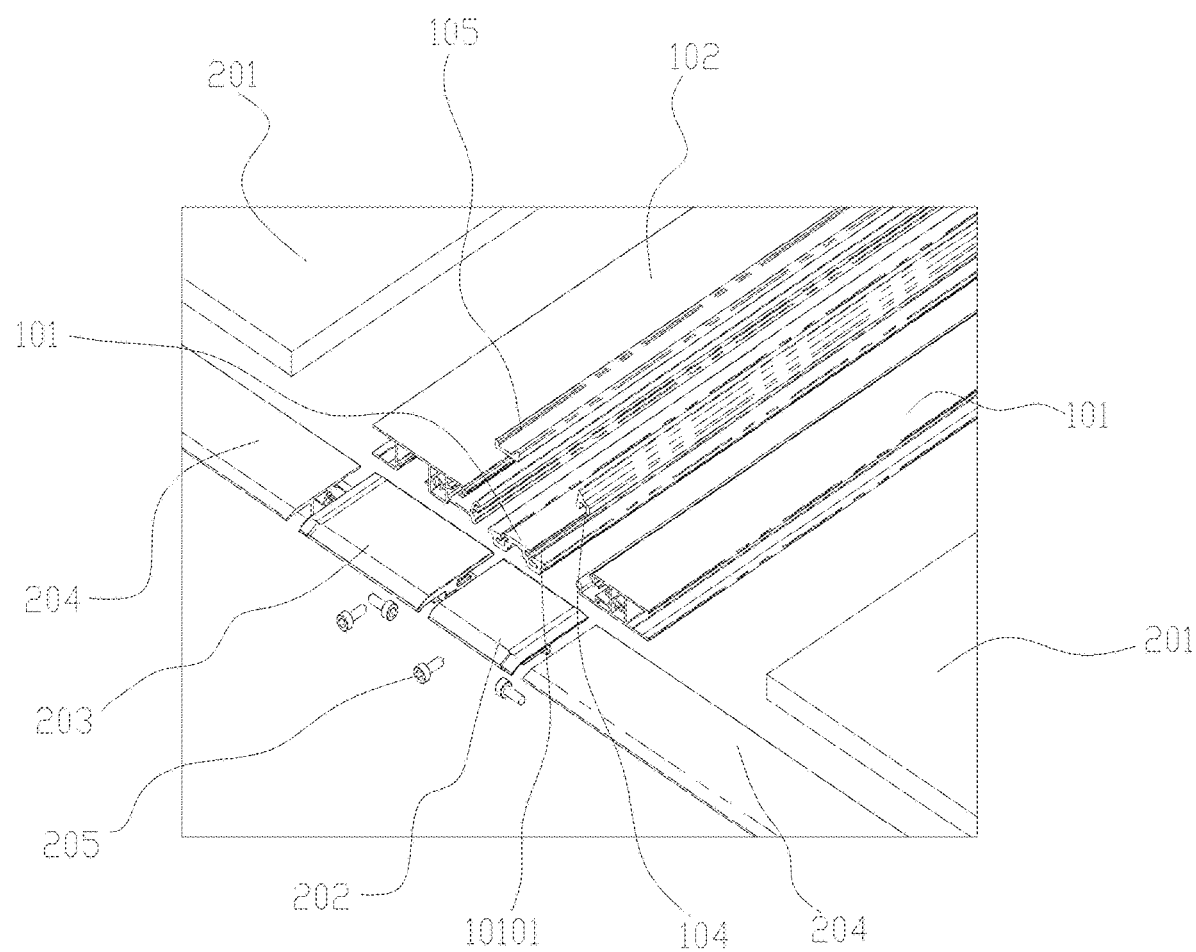
FIG. 3 is an enlarged schematic diagram at A in FIG. 2.

Reference numbers in the figures are as follows: 101. Elastic sealing bar, 10101. Embedding bar, 10102. Inner recess, 102. Main cross rod, 10201. Rotating cylinder, 12301. Projecting piece, 12302. Embedding slot, 12303. Bayonet, 103. Auxiliary cross rod, 10301. Rotating circular cavity, 104. Main plug bar, 105. Auxiliary plug bar, 201. Cover plate, 202. Auxiliary joint, 20201. Rotating head, 203. Main joint, 20301. Rotating groove, 204. Longitudinal rod, 205. Screw, 301. Clamp sliding block, 30101. Slide limiting track, 302. Clamp fixing block, 303. Clamping bolt, 304. Puller bolt, 350. Attached rod, 351. Waterproof rubber bar, 352. Filler rubber bar, 401. Limiting block, 402. Lock tongue base, 403. Positioning block, 404. Connecting block, 405. Spring, 406. Linkage rod, 501. Hollow rubber bar, 351. Waterproof rubber bar, 352. Filler rubber bar, 601. Side rubber bar, 701. Drain joint, 702. Drain pipe, 801. Base, 802. Supporting slider, 803. Puller block, 804. Adjusting bolt, 805. Support rod, 901. Plug socket, 902. Plug buckle, 903. Connecting rod, 904. Cushion block, 905. Connecting piece.

DETAILED DESCRIPTION OF THE INVENTION

The invention will be described in detail below with reference to the drawings.

As shown in FIGS. 1, 2, 3 and 4, a fully-embedded vehicle cover includes a cover plate 201, a main cross rod 102, an auxiliary cross rod 103, a longitudinal rod 204, an elastic sealing bar 101, a main plug bar 104 and an auxiliary plug bar 105; and the main cross rod 102 is maintained in parallel to the auxiliary cross rod 103, T-shaped embedding slots 12302 are provided on both the main cross rod 102 and the auxiliary cross rod 103, T-shaped embedding bars 10101 are provided on the elastic sealing bar 101, the embedding bars 10101 are clamped in the embedding slots 12302, and the elastic sealing bar 101 is used for sealing the gap between the main cross rod 102 and the auxiliary cross rod 103; the main joint 203 is sealed and fixed with the main cross rod 102 and the longitudinal rod 204 to form a frame, the auxiliary joint 202 is sealed and fixed with the auxiliary cross rod 103 and the longitudinal rod 204 to form a frame in which the cover plate 201 is sealed and clamped; the main plug bar 104 is arranged on the main cross rod 102 and used for sealing the gap between the main cross rod 102 and the elastic sealing bar 101, while the auxiliary plug bar 105 is arranged on the auxiliary cross rod 103 and used for sealing the gap between the auxiliary cross rod 103 and the elastic sealing bar 101.

In this device, the main cross rod 102 and the auxiliary cross rod 103 are hinged together by using the elastic sealing bar 101, and due to the elasticity of the elastic sealing bar, the main cross rod 102 and the auxiliary cross rod 103 can rotate with respect to each other with a good sealing performance maintained, thus ensuring that there is no gap between the main cross rod 102 and the auxiliary cross rod 103; meanwhile, with no gap resulting from a sealing matching between the cover plate 201 and the main cross rod 102, the auxiliary cross rod 103 and the longitudinal rod 204 and with a sealing matching between the longitudinal rod 204 and the main 102 or auxiliary 103 cross rod, there is no gap between the longitudinal rod 204, the main cross rod 102, the auxiliary cross rod 103, the cover plate 201 and the elastic sealing bar 101, thus ensuring no water leakage or seepage.

There is no fitting gap between the longitudinal rod 204, the main cross rod 102, the auxiliary cross rod 103, the cover plate 201 and the elastic sealing bar 101 in this structure, which can ensure no water leakage or seepage.

Specifically, the main joint 203 and the auxiliary joint 202 are fixedly connected with the main cross rod 102, the auxiliary cross rod 103 or the longitudinal rod 204 in a screw 205 fixing manner, and the main joint 203 and the auxiliary joint 202 both can be made of materials such as rubber and the like, which presents some degree of hardness and good elasticity to ensure a sealing effect, and in which one end of the main cross rod 102 can be embedded between the main joint 203 and the auxiliary joint 202 in order to reduce a fitting gap with maximum probability.

Figure 5:
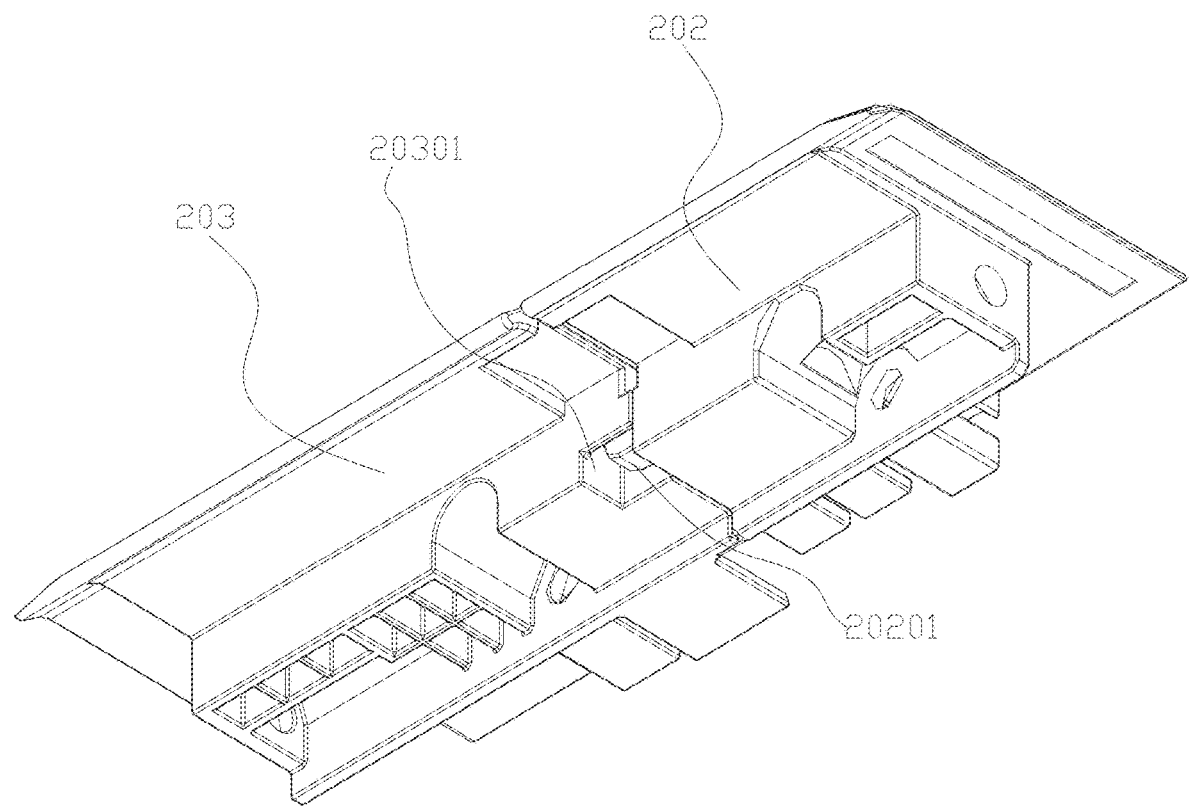
FIG. 5 is a schematic view of the matching relationship between the main joint and the auxiliary joint.
Figure 6:
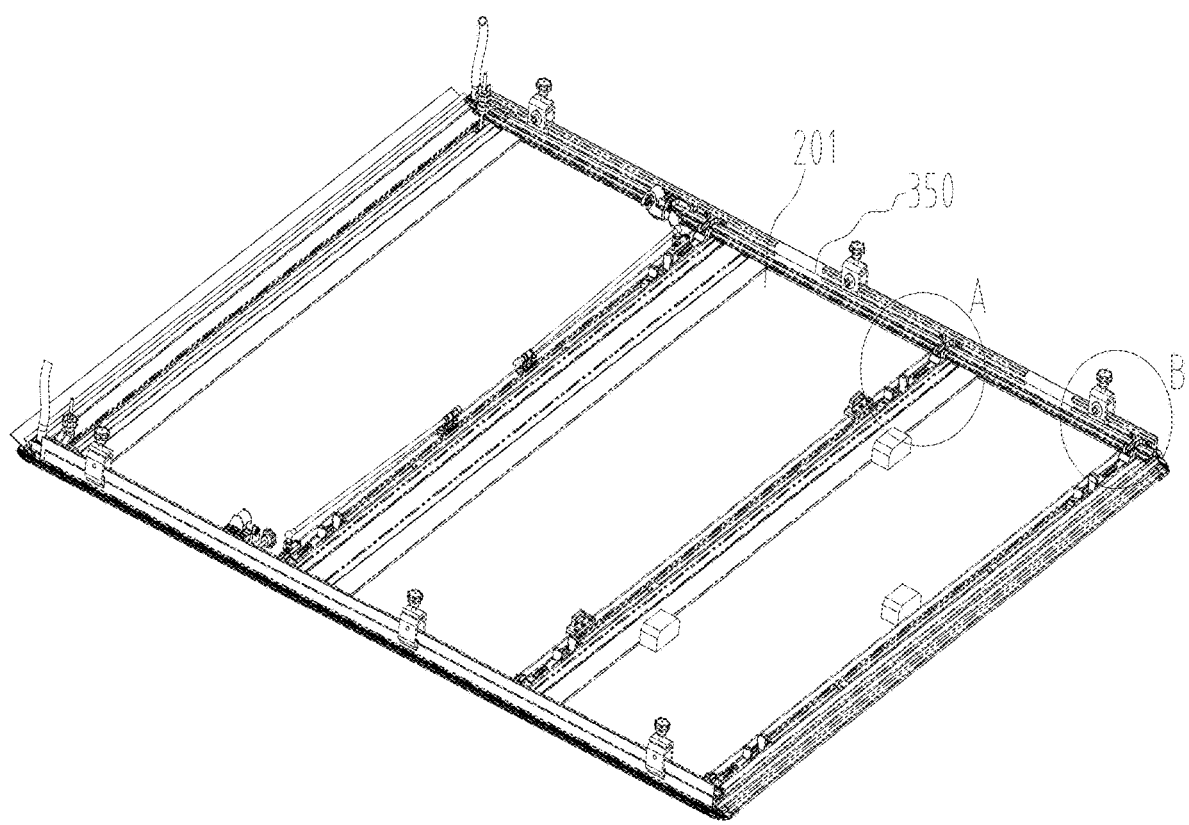
FIG. 6 is a schematic diagram of the positional relationship between the lock tongue base and the cover plate.
Figure 7:
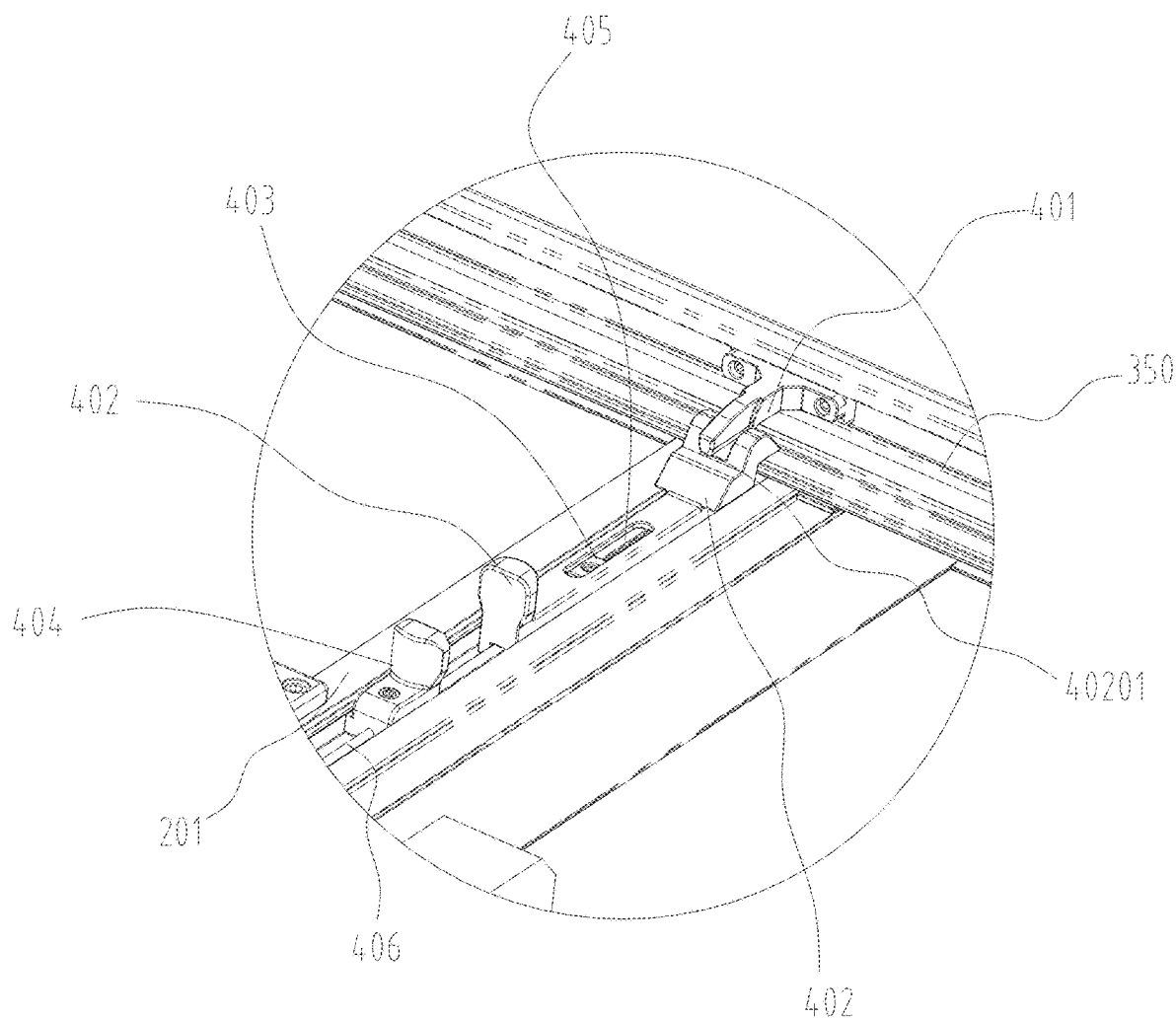
FIG. 7 is an enlarged structural diagram at A in FIG. 6.
Figure 8:
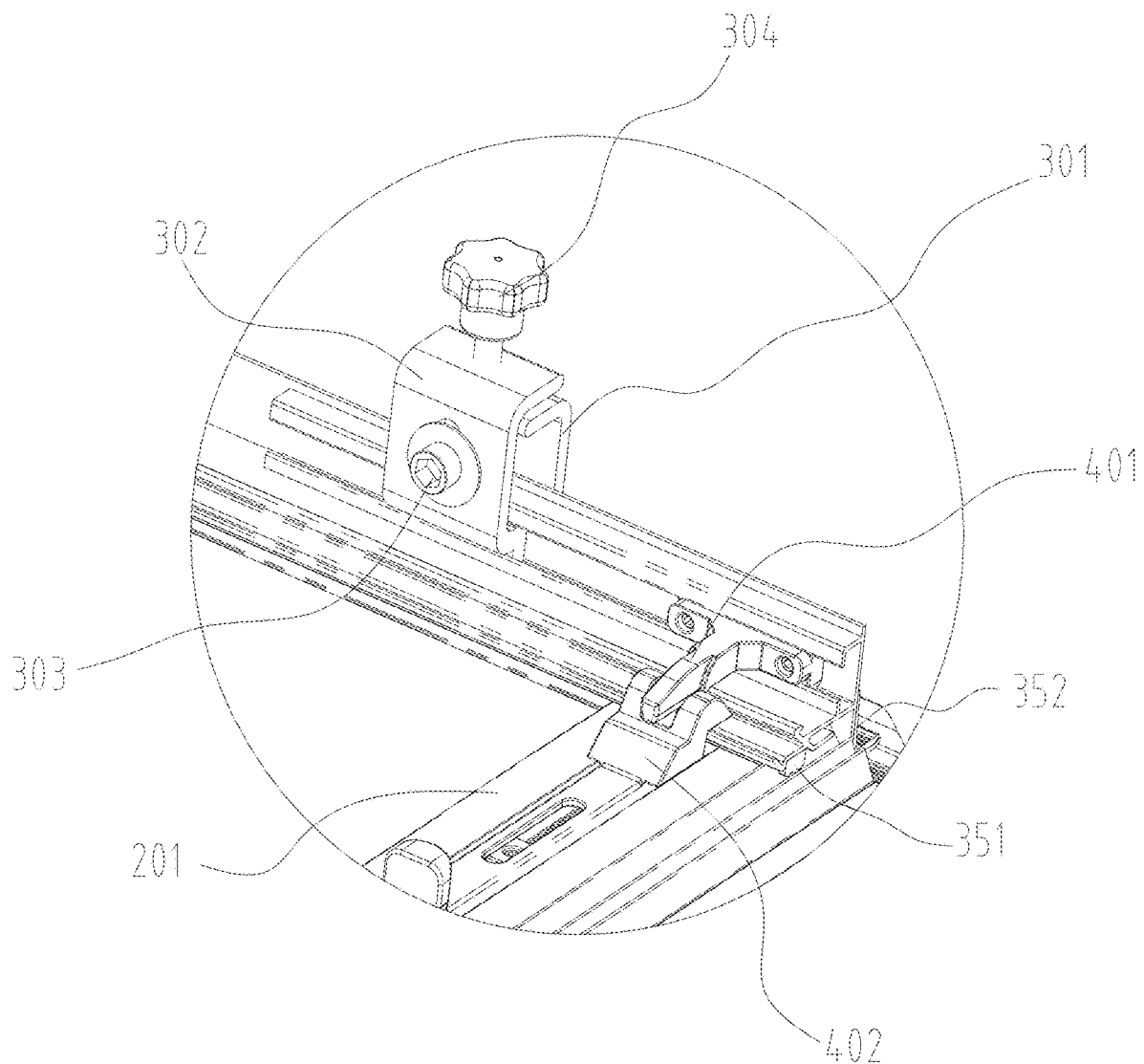
FIG. 8 is an enlarged structural diagram at B in FIG. 6.

As shown in FIG. 5, the main joint 203 is provided with a rotating groove 20301, the auxiliary joint 202 is provided with a rotating head 20201, and the rotating head 20201 is positioned in the rotating groove 20301.

The rotating head 20201 and the rotating groove 20301 function as a limit to ensure that there is no relative sliding offset between the main joint 203 and the auxiliary joint 202.

Figure 4:
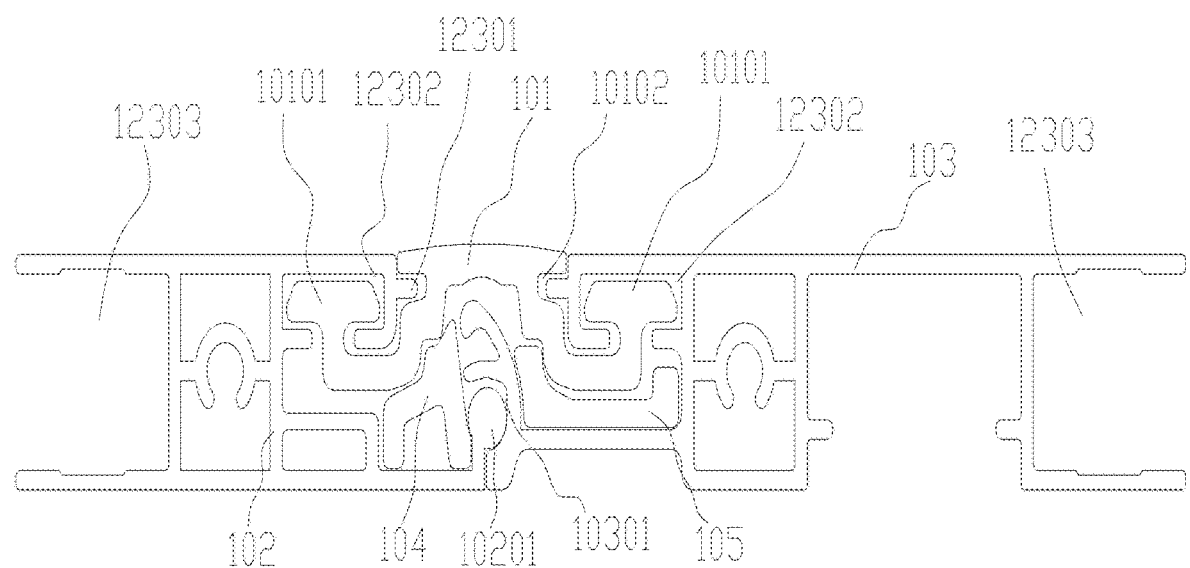
FIG. 4 is a schematic view of the positional relationship between the main rod and the auxiliary rod.

As shown in FIG. 4, a rotating circular cavity 10301 is provided on the auxiliary cross rod 103, and a rotating cylinder 10201 is provided on the main cross rod 102, the rotating cylinder 10201 is matched with the rotating circular cavity 10301 and the auxiliary plug bar 105 elastically presses the rotating cylinder 10201 against into the rotating circular cavity 10301.

The existence of the rotating circular cavity 10301 and the rotating cylinder 10201 equivalently makes the directly hinging of the main cross rod 102 and the auxiliary cross rod 103 together possible, which, in conjunction with the connecting effect of the elastic sealing bar 101, hinges the main cross rod 102 and the auxiliary cross rod 103 together, thus ensuring a stronger connection between the main cross rod 102 and the auxiliary cross rod 103.

As shown in FIG. 4, the main plug bar 104 is an H-shaped main plug bar 104, and the auxiliary plug bar 105 is a half-frame-shaped auxiliary plug bar 105; three contact surfaces of the main plug bar 104 respectively press against the rotating cylinder 10201, the main cross rod 102 and the elastic sealing bar 101, and three contact surfaces of the auxiliary plug bar 105 press against the auxiliary cross rod 103, and one contact surface of the auxiliary plug bar 105 presses against the elastic sealing bar 101.

As shown in FIG. 4, an inner recess 10102 is provided on the elastic sealing bar 101, and projecting pieces 12301 which are plugged and matched with the inner recess 10102 are provide on the main cross rod 102 and the auxiliary cross rod 103.

A relative rotation between the main cross rod 102 (and the auxiliary cross rod 103) and the elastic sealing bar 101 can be made by the plugging matching of the projecting pieces 12301 and the inner recess 10102, without any water leakage at the sealing matching.

As shown in FIG. 4, the main cross rod 102, the auxiliary cross rod 103 and the longitudinal rod 204 are all provided with a bayonet 12303 in which the cover plate 201 is sealed and clamped. The above-mentioned sealing and clamping effect of the bayonet 12303 can ensure that no water leakage occurs between the cover plate 201 and the main cross rod 102, the auxiliary cross rod 103 and the longitudinal rod 204. And in order to ensure there is no water seepage, glue can be applied between the cover plate 201 and the main cross rod 102, between the cover plate 201 and the auxiliary cross rod 103, and between the cover plate 201 and the longitudinal rod 204 to prevent water.

Specifically, the elastic sealing bar 101 may be a rubber bar.

As shown in FIGS. 6, 7, 8, 9 and 10, it further comprises an attached rod 350, a limiting block 401 and a lock tongue base 402, the limiting block 401 is installed on the attached rod 350, and the lock tongue base 402 being directly or indirectly elastically installed on the main cross rod 102 or the auxiliary cross rod 103; a lock tongue groove 40201 is provided on the lock tongue base 402 and the lock tongue groove 40201 of the lock tongue base 402 is used for clamping and matching with the limiting block 401; and the limiting block 401 is clamped and matched with the lock tongue groove 40201 when the attached rod 350 is clamped between the lock tongue base 402 and the cover plate.

In this structure, with the clamping and matching of the lock tongue base 402 and the limiting block 401, the lock tongue base 402 and the limiting block 401 are made to be clamped and matched together when the lock tongue base 402 and the cover plate clamp the attached rod 350, so that the cover plate cannot move relative to the attached rod 350, and the cover plate will not move forward to be folded due to inertia even if the pick-up truck brakes sharply during driving. As shown in FIGS. 6, 7, 8, 9 and 10, it further comprises a positioning block 403 and a spring 405, the positioning block 403 is directly or indirectly fixedly arranged on the cover plate, and the lock tongue base 402 is slidably mounted on the positioning block 403; one end of the spring 405 is abutted against the positioning block 403 while the other end of the spring 405 is abutted against the lock tongue base 402.

As shown in FIGS. 6, 7, 8, 9 and 10, it further comprises a linkage rod 406 and a connecting block 404, the connecting block 404 is slidably mounted on the lock tongue base 402 and two ends of the linkage 406 are respectively fixedly matched with one connecting block 404.

Because both ends of a cover plate need to be respectively provided with a lock tongue base 402 to be matched with the limiting block 401 on the clamping rod, the connecting block 404 and the linkage rod 406 are arranged so that the two lock tongue bases 402 in a line can move synchronously.

Figure 9:
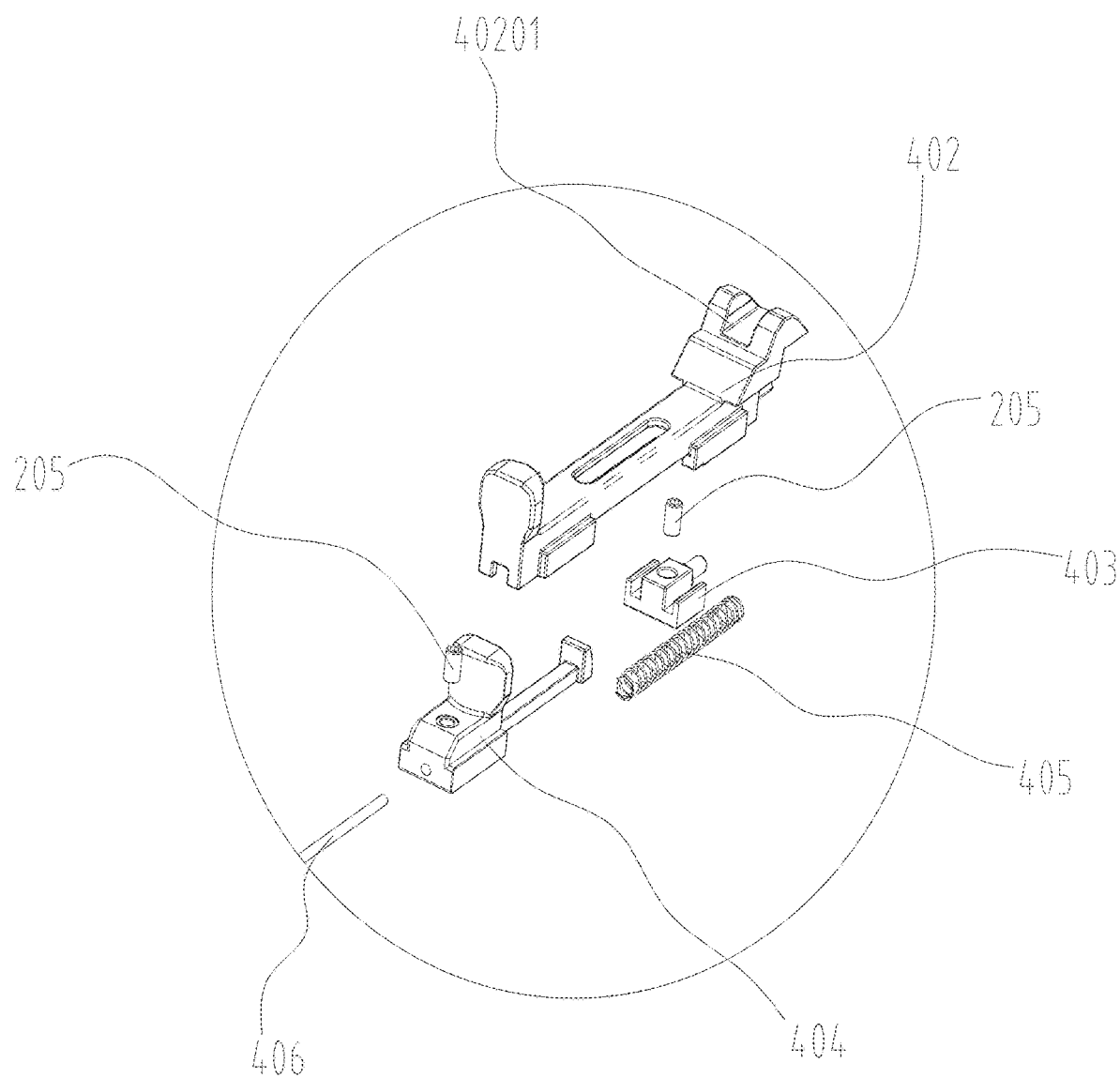
FIG. 9 is a schematic view of the matching relationship among the lock tongue base, the positioning block and the connecting block.
Figure 10:
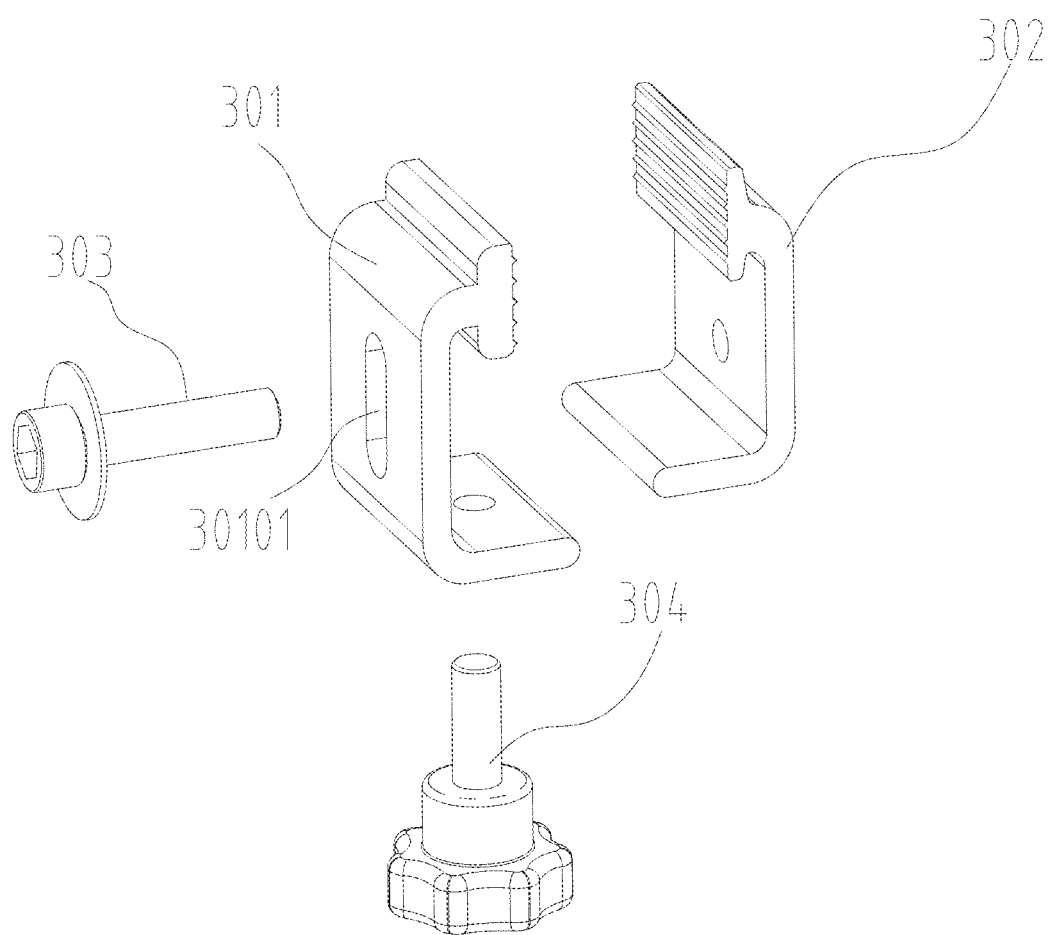
FIG. 10 is a schematic view of the matching relationship between the clamp sliding block and the clamp fixing block.

Referring specifically to FIG. 9, the linkage rod 406 is clamped and fixed on the connecting block 404 by the screw 205; the lock tongue base 402 is provided with a rectangular hole, and one end of the connecting block 404 is located in the rectangular hole, and the connecting block 404 can slide relative to the lock tongue base 402; however, since one end of the connecting block 404 is located in the rectangular hole, the lock tongue base 402 cannot slide out of the rectangular hole. As shown in FIGS. 6, 7, 8, 9 and 10, it further comprises a clamp sliding block 301, a clamp fixing block 302, a clamping bolt 303 and a puller bolt 304, a slide limiting track 30101 is provided on the clamp sliding block 301, the clamping bolt 303 is matched with a screw hole on the clamp fixing block 302 and the clamping bolt 303 is slidably matched with the slide limiting track 30101; the puller bolt 304 being mounted on the screw hole of the clamp sliding block 301 with one end thereof being pressed against the clamp fixing block 302, and the puller bolt 304 is perpendicular to the clamping bolt 303; the attached rod 350 is movably clamped between the clamp sliding block 301 and the clamp fixing block 302.

The function of the clamp sliding block 301, clamp fixing block 302, clamping bolt 303 and puller bolt 304 is to facilitate the installation of the attached rod 350 on the hopper of the pick-up truck. As shown in FIGS. 6, 7, 8, 9 and 10, the clamp fixing block 302 and the clamp sliding block 301 are both provided with a corrugated groove which is used for increasing a friction force between the clamp fixing block 302 and the clamp sliding block 301 or the attached rod 350.

As shown in FIGS. 6, 7, 8, 9 and 10, the clamp fixing block 302 is an L-shaped one 302, and the clamp sliding block 301 is also an L-shaped one 301.

Figure 11:
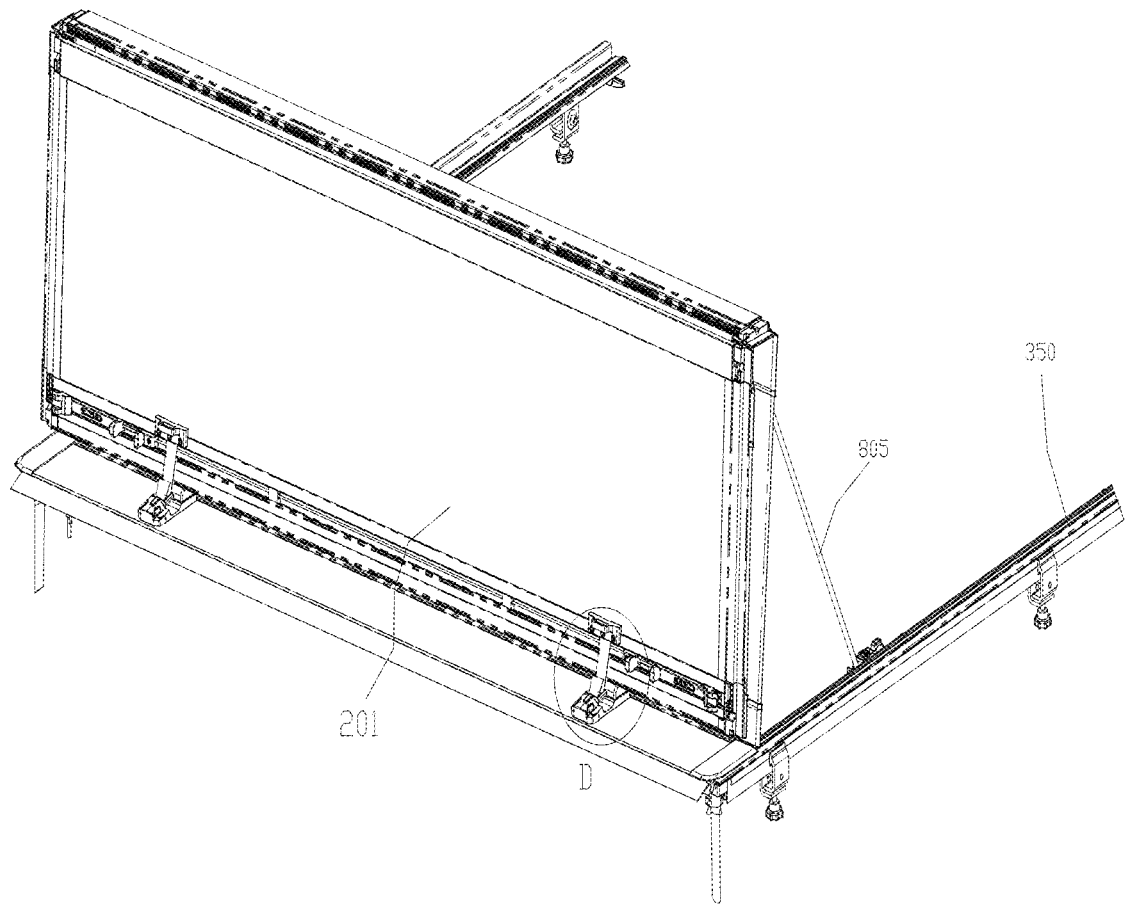
FIG. 11 is a schematic diagram of the installation structure of the waterproof rubber bar and hollow rubber bar.
Figure 16:
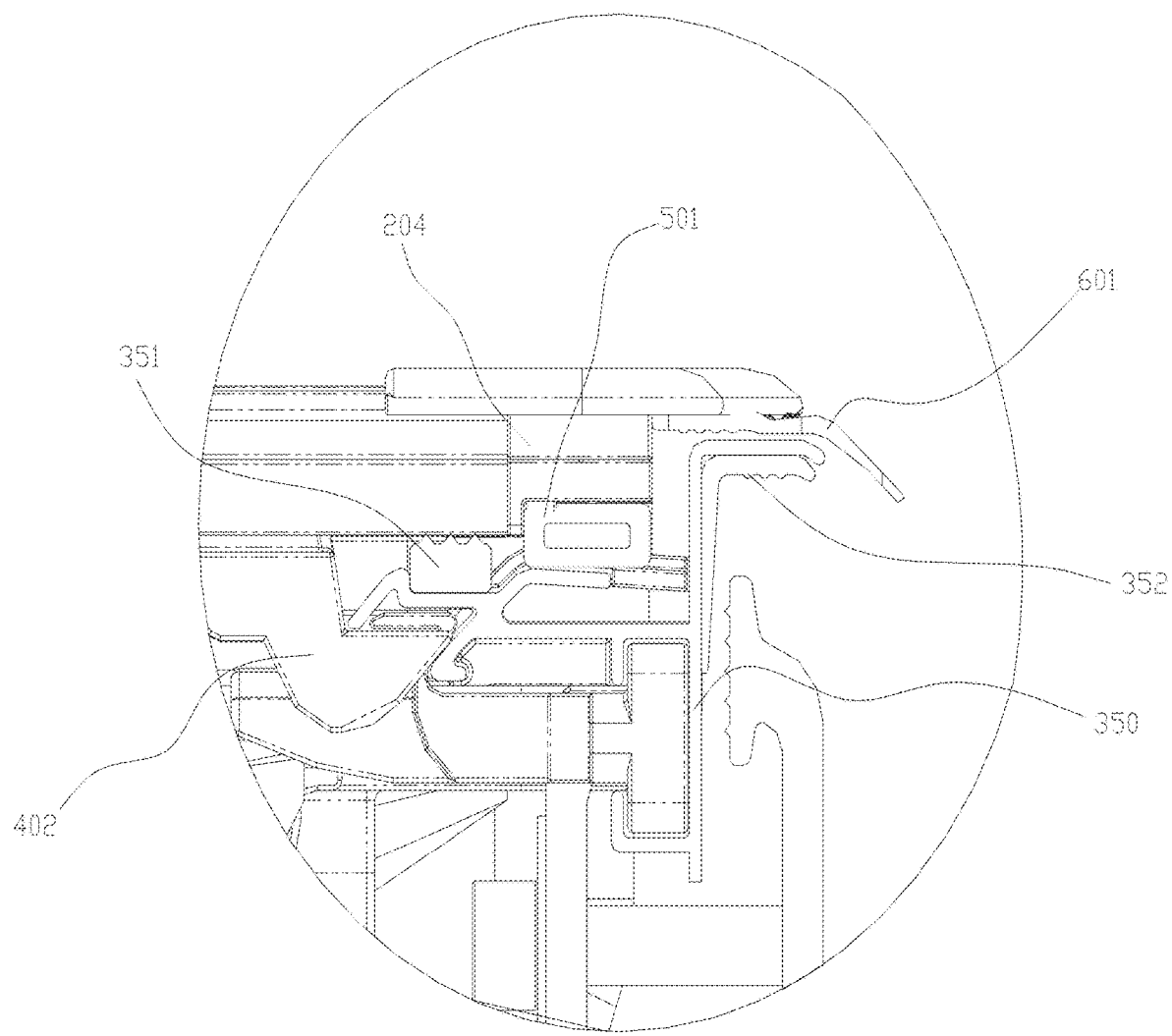
FIG. 16 is a schematic view of the positional relationship between the waterproof rubber bar and the hollow rubber bar on the attached rod.

As shown in FIGS. 11 and 16, it further comprises a waterproof bar and a hollow bar, the waterproof bar is arranged on the attached rod 350 and the hollow bar is arranged on the frame; and when the frame is covered on the attached rod 350, the waterproof bar is maintained in parallel to the hollow bar and the waterproof bar and the hollow bar are closely attached against the longitudinal rod 204 and the attached rod 350.

Specifically, the hollow bar is a hollow rubber bar 501, and the waterproof bar is a waterproof rubber bar 351; and due to a degree of compressibility of the hollow rubber bar 501, the sealing effect is better than that of a conventional solid rubber bar. Also included are a waterproof rubber bar 351 and a filler rubber bar 352, both of which are arranged on the attached rod 350.

Referring specifically to FIG. 16, a filler rubber bar 352 is disposed on a outer side wall of the attached rod 350.

As shown in FIG. 16, it further comprises a side bar, specifically a side bar 601, the function of which is to guide the water from the cover plate so that the water will not flow to the vicinity of the attached rod 350 and the frame.

Figure 13:
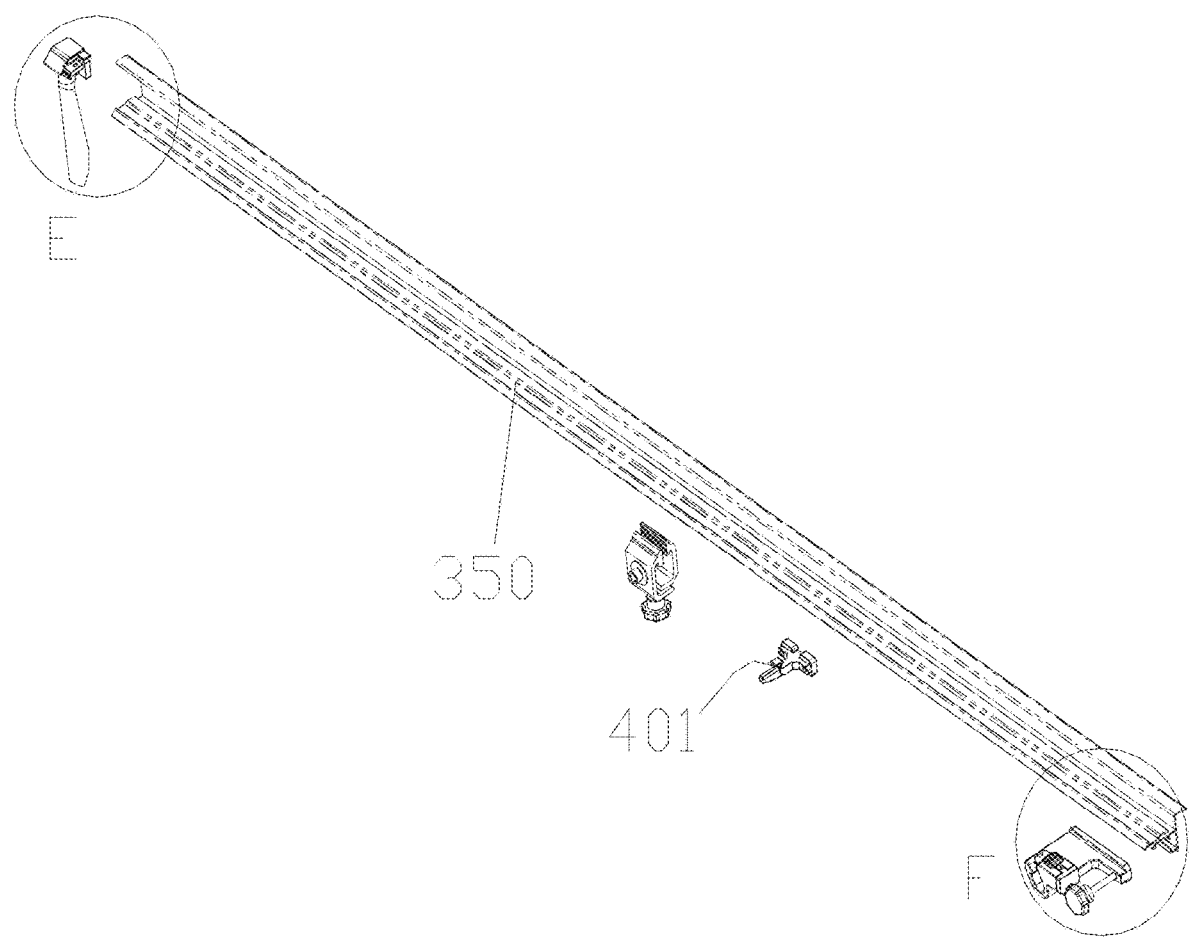
FIG. 13 is a schematic diagram of the installation relationship of each component on the attached rod.
Figure 14:
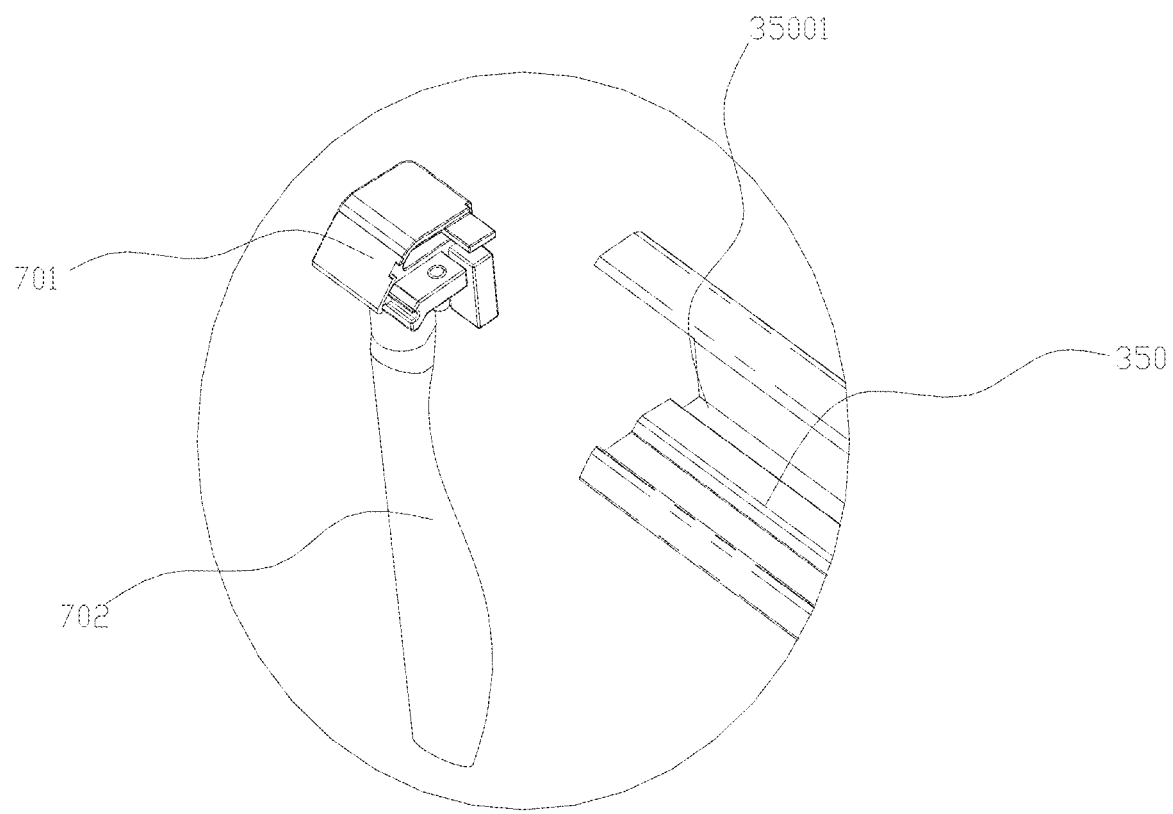
FIG. 14 is an enlarged schematic view at E in FIG. 13.

As shown in FIGS. 11, 13 and 14, it further comprises a drainage pipe 702 and a drainage joint 701, a drainage groove 35001 is provided on the attached rod 350, the drainage joint 701 is fixed on the attached rod 350, the drainage pipe 702 is mounted on the drainage joint 701 which is communicated with the drainage pipe 702 and the drainage groove 35001.

The purpose of setting the drainage groove 35001 is to collect the water seeping into the attached rod 350, and then drain the water in the drainage groove 35001 by the water guiding function of the drain pipe 702.

As shown in FIG. 14, the drainage joint 701 is plugged and matched with the attached rod 350 through its own protruding block, and the drainage joint 701 and the attached rod 350 are fixed together through screws.

The plugging and matching of the drainage joint 701 with the attached rod 350 through its own protruding block ensures that the drainage joint 701 does not shift from and shake with the attached rod 350.

Figure 15:
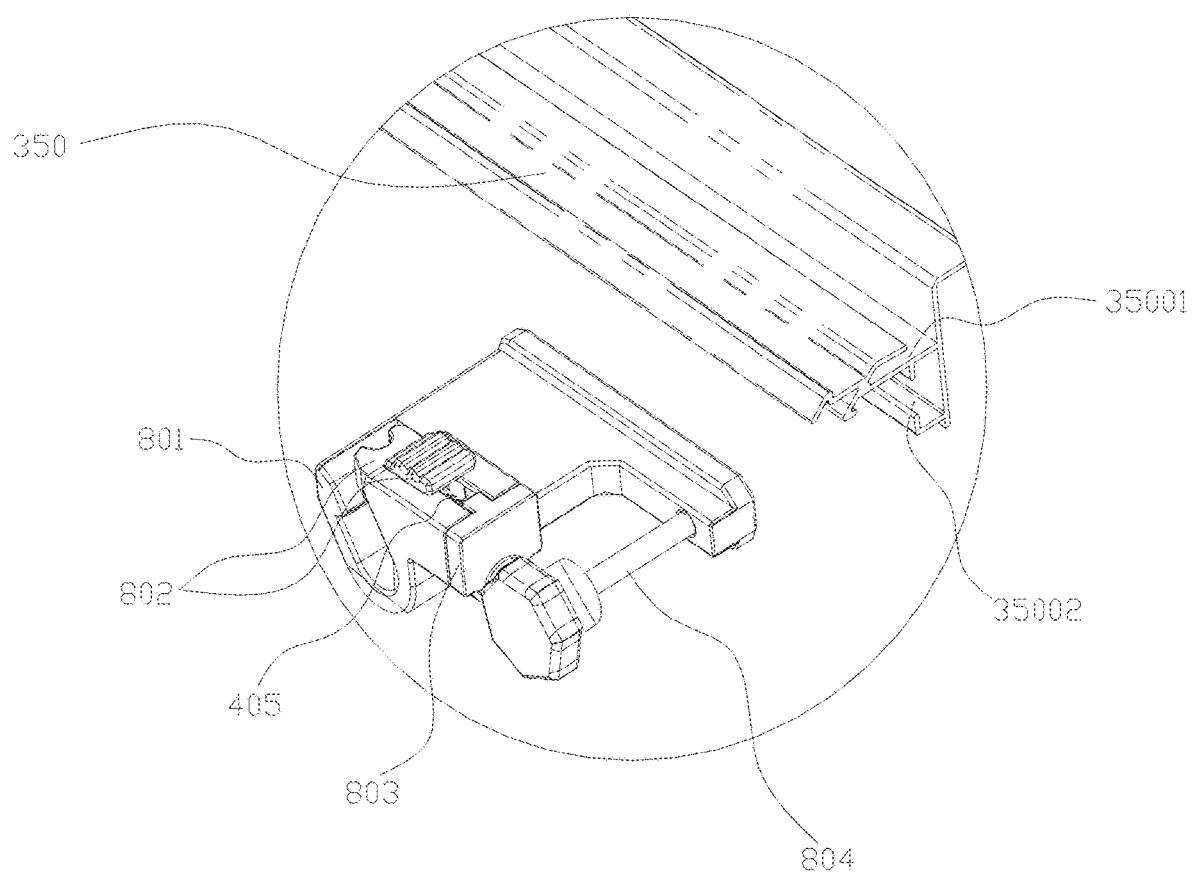
FIG. 15 is an enlarged schematic view at F in FIG. 13.

As shown in FIGS. 11, 13 and 15, it further comprises a support rod 805 and a support base, one end of the support rod 805 is directly or indirectly hinged with the cover plate while the other end thereof is used for movably matching with the support base, and the support base is mounted on the attached rod 350.

As shown in FIG. 15, a mounting chute 35002 is provided on the attached rod 350, and the support base comprises a base 801, a supporting slider 802, a spring 405, a puller block 803 and an adjusting bolt 804, the base 801 is slidably mounted on the mounting chute 35002 of the attached rod 350, the adjusting bolt 804 is mounted on the base 801 and used for clamping the base 801 on the attached rod 350, the supporting slider 802 is slidably mounted on the base 801, the puller block 803 is fixed on the base 801, both ends of the spring 405 are respectively pressed against the puller block 803 and the supporting slider 802, and the gap between the supporting slider 802 and the base 801 is used for clamping the support rod 805.

Because the cover plate needs to be folded on the attached rod 350 when the hopper is not covered, the above structure is provided so that when the cover plate is folded on the attached rod 350, the support rod 805 is clamped between the base 801 and a supporting slider 802, and the support rod 805 is used to support and fix the cover plate. And one end of the support rod 805 is hinged on the cover plate or on the main cross rod or the auxiliary cross rod while the other end thereof is clamped between the base 801 and the supporting slider 802, so the whole process of causing the cover plate to cover and fold (i.e. open) is very convenient.

Figure 12:
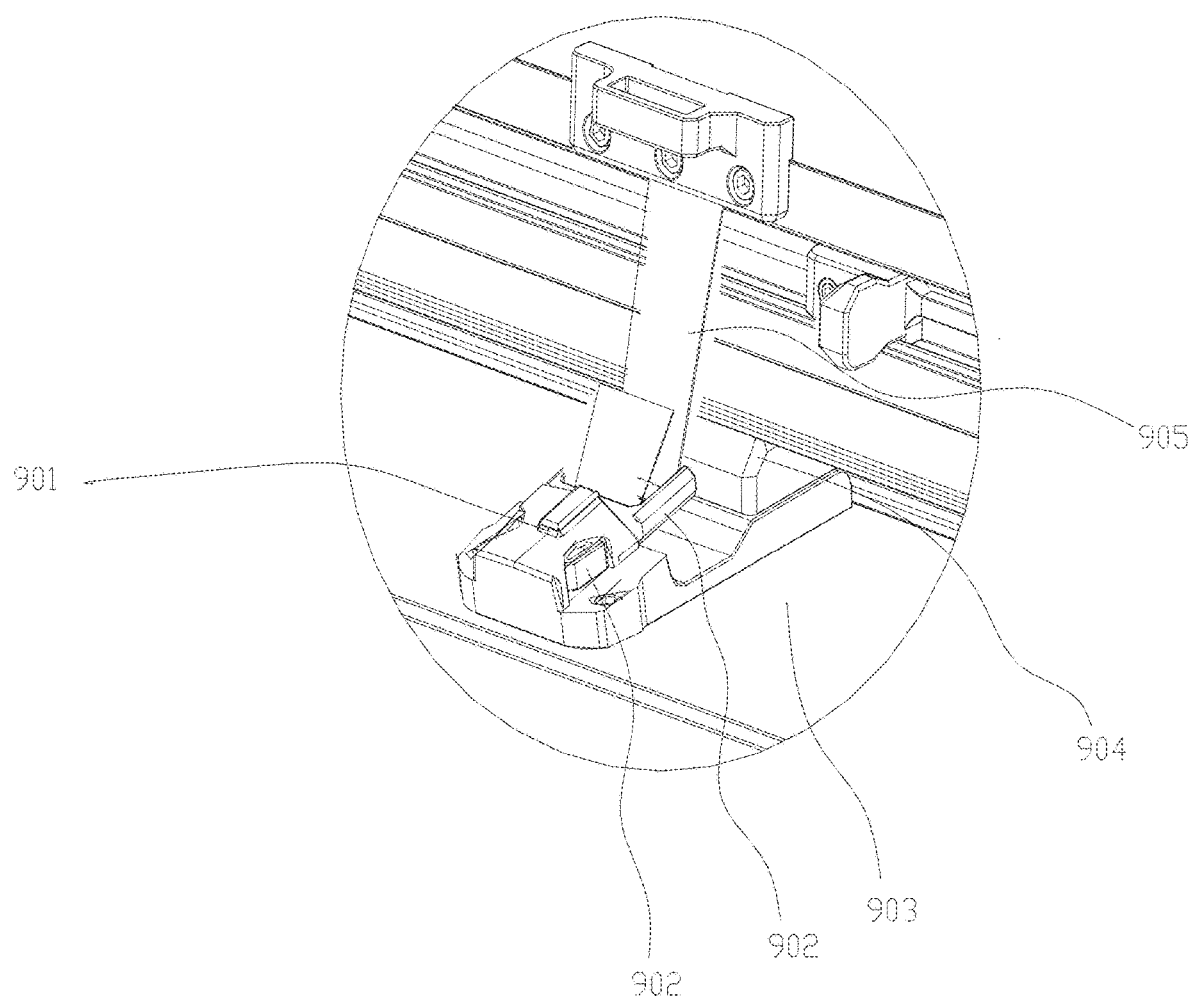
FIG. 12 is an enlarged schematic view at D in FIG. 11.

As shown in FIGS. 11 and 12, it further comprises a plug socket 901 and a plug buckle 902, the plug socket 901 is directly or indirectly fixed on the attached rod 350, the plug buckle 902 is directly or indirectly fixed on the cover plate, and the plug buckle 902 is used for movably plugging and matching with the plug socket 901.

Because a part of the frame is fixed on the attached rod 350, the plug socket 901 and the plug buckle 902 described above are arranged so that the whole cover plate system can be disassembled from the attached rod 350 at any time as required through the detachable matching of the plug socket 901 and the plug buckle 902.

As shown in FIG. 12, it further comprises a connecting rod 903, a cushion block 904 and a connecting piece 905, the connecting rod 903 connects two parallel and adjacent attached rods 350 together; the plug socket 901 is fixed on the connecting rod 903 through the cushion block 904; the plug buckle 902 is fixed on the connecting piece 905 which is directly or indirectly fixed on the cover plate.

Because there are two attached rods 350 which are parallel, the two attached rods 350 need to be connected together by a connecting rod 903, and a plurality of plug sockets 901 can be provided through an arrangement thereof on the connecting rod 903, and specifically the connecting piece 905 is fixed on the main cross rod 102 or the auxiliary cross rod 103 of the frame.

The above description is only the preferred embodiment of the invention, which does not limit the scope of patent protection of the invention as such, and any equivalent structural transformation made by using contents of the description and drawings of the invention, directly or indirectly applied to other related technical fields, are similarly encompassed in the scope of protection of the invention.

What is claimed is:

1. A fully-embedded vehicle cover, wherein it comprises a cover plate, a main cross rod, an auxiliary cross rod, a longitudinal rod, an elastic sealing bar and at least one plug bar, the main cross rod being maintained in parallel to the auxiliary cross rod; a plurality of T-shaped embedding slots being provided on both the main cross rod and the auxiliary cross rod; a plurality of T-shaped embedding bars being provided on the elastic sealing bar; the embedding bars being clamped and embedded in the embedding slots; the elastic sealing bar being used for sealing gaps between the main cross rod and the auxiliary cross rod; the longitudinal rod and the main cross rod being directly or indirectly sealingly matched together to form a first frame, the longitudinal rod and the auxiliary cross rod being directly or indirectly sealingly matched together to form a second frame; and the cover plate being sealingly clamped and embedded in the frames;

wherein the at least one rubber plug bar comprises a main plug bar and an auxiliary plug bar, the main plug bar being arranged on the main cross rod, and the main plug bar being used for sealing the gaps between the main cross rod and the elastic sealing bar; the auxiliary plug bar being arranged on the auxiliary cross rod and used for sealing the gaps between the auxiliary cross rod and the elastic sealing bar;

wherein a rotating circular cavity is provided on the auxiliary cross rod, and a rotating cylinder is provided on the main cross rod, the rotating cylinder being matched with the rotating circular cavity and the auxiliary plug bar elastically pressing the rotating cylinder against into the rotating circular cavity.

2. The fully-embedded vehicle cover of claim 1, wherein the fully-embedded vehicle cover further comprises a main joint and an auxiliary joint, the main joint being fixed with a main cross rod and a longitudinal rod respectively to form a frame, the auxiliary joint being fixedly connected with the auxiliary cross rod and the longitudinal rod to form a frame, and the longitudinal rod being perpendicular to the main cross rod or the auxiliary cross rod; and the main joint being provided with a rotating groove, the auxiliary joint being provided with a rotating head, and the rotating head being positioned in the rotating groove.

3. The fully-embedded vehicle cover of claim 1, wherein the main plug bar is an h-shaped main plug bar, and the auxiliary plug bar is a half-frame-shaped auxiliary plug bar; three contact surfaces of the main plug bar respectively press against the rotating cylinder, the main cross rod and the elastic sealing bar, and three contact surfaces of the auxiliary plug bar press against the auxiliary cross rod, and one contact surface of the auxiliary plug bar presses against the elastic sealing bar.

4. The fully-embedded vehicle cover of claim 1, wherein an inner recess is provided on the elastic sealing bar, projecting pieces which are plugged and matched with the inner recess are provided on the main cross rod and the auxiliary cross rod; and the main cross rod, the auxiliary cross and the longitudinal rod are all provided with a bayonet in which the cover plate is sealed and clamped.

5. A fully-embedded vehicle cover, wherein it comprises a cover plate, a main cross rod, an auxiliary cross rod, a longitudinal rod, an elastic sealing bar and a plug bar, the main cross rod being maintained in parallel to the auxiliary cross rod; a plurality of T-shaped embedding slots being provided on both the main cross rod and the auxiliary cross rod; a plurality of T-shaped embedding bars being provided on the elastic sealing bar; the embedding bars being clamped and embedded in the embedding slots; the elastic sealing bar being used for sealing gaps between the main cross rod and the auxiliary cross rod; the longitudinal rod and the main cross rod being directly or indirectly sealingly matched together to form a first frame, the longitudinal rod and the auxiliary cross rod being directly or indirectly sealingly matched together to form a second frame; and the cover plate being sealingly clamped and embedded in the frames
    wherein the fully-embedded vehicle cover further comprises an attached rod, a limiting block and a lock tongue base, the main cross rod or the auxiliary cross rod being arranged on the attached rod, the limiting block being installed on the attached rod, and the lock tongue base being directly or indirectly elastically installed on the main cross rod or the auxiliary cross rod; a lock tongue groove being provided on the lock tongue base and the lock tongue groove of the lock tongue base being used for clamping and matching with the limiting block; and the limiting block being clamped and matched with the lock tongue groove when the attached rod is clamped between the lock tongue base and the cover plate.

6. The fully-embedded vehicle cover of claim 5, wherein the fully-embedded vehicle cover further comprises a positioning block and a spring, the positioning block being directly or indirectly fixedly arranged on the main cross rod or the auxiliary cross rod and the lock tongue base being slidably mounted on the positioning block; one end of the spring being abutted against the positioning block while another end of the spring is abutted against the lock tongue base.

7. The fully-embedded vehicle cover of claim 5, wherein the fully-embedded vehicle cover further comprises a linkage rod and a connecting block, the connecting block being slidably mounted on the lock tongue base and two ends of the linkage rod being respectively fixedly matched with one connecting block.

8. The fully-embedded vehicle cover of claim 5, wherein the fully-embedded vehicle cover further comprises a clamp sliding block, a clamp fixing block, a clamping bolt and a puller bolt, a slide limiting track being provided on the clamp sliding block, the clamping bolt being matched with a screw hole on the clamp fixing block and the clamping bolt being slidably matched with the slide limiting track; the puller bolt being mounted on the screw hole of the clamp sliding block with one end thereof being pressed against the clamp fixing block, and the puller bolt being perpendicular to the clamping bolt; the attached rod being movably clamped between the clamp sliding block and the clamp fixing block.

9. The fully-embedded vehicle cover of claim 8, wherein the clamp fixing block and the clamp sliding block are both provided with a corrugated groove which is used for increasing a friction force between the clamp fixing block and the clamp sliding block or the attached rod; and the clamp fixing block is an L-shaped one, and the clamp sliding block is also an L-shaped one.

10. The fully-embedded vehicle cover of claim 5, wherein the fully-embedded vehicle cover further comprises a waterproof bar and a hollow bar, the waterproof bar being arranged on the attached rod and the hollow bar being arranged on the main cross rod or the auxiliary cross rod or the longitudinal rod; the waterproof bar being maintained in parallel to the hollow bar and the waterproof bar being maintained in parallel to the hollow bar; and the waterproof bar and the hollow bar being closely attached to the attached rod and the longitudinal rod.

11. The fully-embedded vehicle cover of claim 2, wherein the fully-embedded vehicle cover also comprises a side bar, which is arranged on the main joint or the auxiliary joint or on the main cross rod or a sub cross rod or the longitudinal rod.

12. The fully-embedded vehicle cover of claim 5, wherein the fully-embedded vehicle cover further comprises a drainage pipe and a drainage joint, a drainage groove being provided on the attached rod, the drainage joint being fixed on the attached rod, the drainage pipe being mounted on the drainage joint which is in communication with the drainage pipe and the drainage groove.

13. The fully-embedded vehicle cover of claim 12, wherein the drainage joint is plugged and matched with the attached rod through its own protruding block, and the drainage joint and the attached rod are fixed together through a plurality of screws.

14. The fully-embedded vehicle cover of claim 5, wherein the fully-embedded vehicle cover further comprises a support rod and a support base, one end of the support rod being directly or indirectly hinged with the cover plate while another end thereof is used for movably matching with the support base, and the support base being mounted on the attached rod.

15. The fully-embedded vehicle cover of claim 14, wherein a mounting chute is provided on the attached rod, and the support base comprises a base, a supporting slider, a spring, a puller block and an adjusting bolt, the base being slidably mounted on the mounting chute of the attached rod, the adjusting bolt being mounted on the base, the adjusting bolt being used for clamping the base on the attached rod, the supporting slider being slidably mounted on the base, the puller block being fixed on the base, both ends of the spring being respectively pressed against the puller block and the supporting slider, and a gap between the supporting slider and the base is used for clamping the support rod.

16. The fully-embedded vehicle cover of claim 5, wherein the fully-embedded vehicle cover further comprises a plug socket and a plug buckle, the plug socket being directly or indirectly fixed on the attached rod, the plug buckle being directly or indirectly fixed on the cover plate, and the plug buckle being used for movably plugging and matching with the plug socket.

17. The fully-embedded vehicle cover of claim 16, wherein the fully-embedded vehicle cover also comprises a connecting rod, a cushion block and a connecting piece, the connecting rod connecting two parallel and adjacent attached rods together; the plug socket being fixed on the connecting rod through the cushion block; the plug buckle being fixed on the connecting piece which is directly or indirectly fixed on the cover plate.

\* \* \* \* \*